United States Patent
Fujimoto et al.

[15] 3,645,709
[45] Feb. 29, 1972

[54] PROCESS FOR MANUFACTURE OF FLAT GLASS ON A MOLTEN METAL BATH

[72] Inventors: Yukiya Fujimoto; Isao Kurashina, both of Kyoto, Japan

[73] Assignee: Nippon Sheet Glass Co., Ltd., Osaka, Japan

[22] Filed: Mar. 9, 1970

[21] Appl. No.: 17,639

[30] Foreign Application Priority Data

Mar. 12, 1969 Japan..................................44/19137
Apr. 22, 1969 Japan..................................44/31849

[52] U.S. Cl. .....................................65/27, 65/99 A, 65/168, 65/182 R
[51] Int. Cl. .......................................................C03b 18/02
[58] Field of Search...............65/99 A, 182 R, 168, 27, 374 S

[56] References Cited

UNITED STATES PATENTS 3,356,475  12/1967  Lookes et al..........................65/182 R
3,317,299  5/1967   Bre.......................................65/182 R

*Primary Examiner*—Arthur D. Kellogg
*Attorney*—Wenderoth, Lind & Ponack

[57] ABSTRACT

In a process for the manufacture of flat glass which comprises flowing molten glass onto a molten metal bath and advancing the molten glass on the bath in ribbon form, the improvement residing in that the molten metal is contacted with a refractory of acidic or neutral oxide or low alkali or nonalkali glass which is replaceably immersed in the molten metal bath, and that the refractory or low alkali or nonalkali glass on which the reaction product thereof with the alkali metal oxide in the molten metal is formed is withdrawn from the bath to be replaced by new refractory or glass at regular intervals.

10 Claims, 7 Drawing Figures

3,645,709

PATENTED FEB 29 1972

YUKIYA FUJIMOTO and
ISAO KURASHINA, Inventors

By. Wenderoth, Lind & Ponack
Attorneys

YUKIYA FUJIMOTO and
ISAO KURASHINA,
Inventors

By Wendroth, Lind & Ponack
Attorneys

PROCESS FOR MANUFACTURE OF FLAT GLASS ON A MOLTEN METAL BATH

This invention relates to a process for the manufacture of flat glass. More particularly, the invention relates to an improvement in the manufacture of flat glass by the process normally referred to as float process, in which molten glass is caused to flow onto a bath of molten metal and advanced on said bath in ribbon form.

When molten glass is caused to flow onto a molten metal bath and advanced thereon in ribbon form for making flat glass in the conventional manner, occasionally glassy foreign matter adheres to the bottom of the glass ribbon on the bath, whereby remarkably reducing the yield of product.

We have searched for the cause of formation of this foreign matter from various angles, to find that the glassy portion is formed on the surface of refractory used as the bottom material of the tank structure contained in the molten metal bath, that when the glassy portion reaches a predetermined thickness, it departs from the refractory to come up to the molten metal surface and adhere onto the bottom of the glass ribbon as foreign matter, and that the cause of glassy surface formation on the refractory as the construction material of the tank is accumulation of alkali metal oxide in the molten metal which reacts with the refractory at the surfaces of the latter. Although the cause of accumulation of alkali metal oxide in the molten is not yet fully clear, presumably, when a melt of an ordinary soda lime silicate type molten glass containing 10–20 weight percent alkali metal oxides is flown on a molten metal and allowed to advance thereon to form a glass ribbon, alkali metals in the glass ribbon advancing on the molten metal are exchanged with metals of metal oxides of very small amounts contained in the molten metal bath to form alkali metal oxides and diffuse in the molten metal.

Accordingly, therefore, the primary object of the invention is to inhibit the tendency of glassy foreign matter adhering onto the bottom of glass ribbon on the molten metal bath, by removing the alkali metal oxide which is dissolved and dispersed in the molten metal.

Furthermore, in the conventional manufacture of flat glass by causing molten glass to flow onto a molten metal bath and advancing the same on the molten metal in ribbon form, occasionally the gaseous matter dissolved in the molten metal at the high temperature portion of the molten metal bath becomes bubbles at the relatively lower temperature portion of the bath to rise up to the bottom of glass ribbon and impair the quality of the product. Particularly, when the molten metal bath is covered with nonoxidizing atmosphere containing hydrogen in order to prevent oxidation of the molten metal, the hydrogen is dissolved in the molten metal in large quantities, making the problem of above bubble formation more serious.

In order to overcome this problem, heretofore such measures as lowering the temperature of molten metal bath to reduce the amount of gases soluble in the metal, or minimizing the temperature difference in the molten metal bath to reduce the bubble formation, have been practiced. However, those measures have their drawbacks as accompanying degradation in flatness of glass ribbon or failure to produce glass ribbon of sufficient width.

Accordingly, the second object of the present invention is to provide a method of effectively reducing the amount of gases dissolved in the molten metal with simple and easy procedure.

We discovered that, in the float process already described, if the molten metal is contacted with a refractory of acidic or neutral oxide or low alkali or nonalkali glass, which is detachably placed in the molten metal bath, the alkali metal oxide contained in the molten metal is effectively caught or trapped on the surface of said refractory or glass as the reaction product therewith, and as the result the tendency of the refractory construction material of the tank to form excessively thick glassy layer on its surface is effectively inhibited. We also discovered that, if specific refractory is selected as the detachable member or members to be contacted with the molten metal in the tank, the refractory acts as the nuclei for foaming the gaseous matter dissolved in the molten metal bath, thereby serving to effectively reduce the gases dissolved in the bath, while concurrently performing the above trapping action.

Thus, according to the present invention, a process for the manufacture of flat glass comprising flowing molten glass onto a bath of molten metal and advancing said glass on the bath surface in ribbon form, which is characterized in that the molten metal is contacted with a refractory of acidic or neutral oxide or low alkali or nonalkali glass member replaceably immersed in the molten metal bath, and that said refractory or low alkali glass on which the reaction product thereof with alkali metal oxide is formed is withdrawn from the molten metal bath a predetermined intervals, is provided.

According to the invention, furthermore, a process for the manufacture of flat glass comprising flowing molten glass onto a bath of molten metal and advancing said glass on the bath surface in ribbon form, which is characterized in that the molten metal is contacted with a refractory composed of $Al_2O_3$ and $SiO_2$ at the weight ratios within the range of 15:85 to 35:65, which is replaceably immersed in the molten metal bath at the positions spaced sidewards from the glass ribbon, to cause foaming of the gaseous matter dissolved in the molten metal bath with said refractory serving as the nuclei of bubbles, and thereby to reduce the quantity of said dissolved gas, and that said refractory on which the reaction product thereof with alkali metal oxide is formed is withdrawn from the molten metal bath at predetermined intervals, is provided.

The material to be used for the elimination of alkali metal oxide in the molten metal in accordance with the invention is required to act as an acidic substance to the alkali metal oxide at least at the temperatures in the vicinity of 1,000° C., to be stable at said temperatures, to be inert to the molten metal, and not to be detrimental to the quality of glass ribbon on the surface of molten metal. In order to meet such requirements, in the present invention refractory of acidic or neutral oxide, or low alkali or nonalkali glass is used as such material. The term, "refractory of acidic or neutral oxide" is well known among the trade, and is used in the generally understood sense in the present specification and claims. As the acidic refractory, refractories of high silica content, for example, silica refractories, fire clay refractories, etc., may be named. Also as the neutral refractories, for example high alumina refractories containing at least 50 percent of $Al_2O_3$ are used. The refractories particularly preferred for the purpose of this invention are alumina-silicate type refractories, inter alia, those in which the weight ratio of $Al_2O_3/SiO_2$ ranges from 15/85 to 35/65, and the total of alumina and silica amounts to at least 90 percent by weight. The specified alumina-silicate type refractories most readily react with the alkali metal oxide in the molten metal, to effectively seize the alkali metal oxide on its surface as glassy layer. The refractories may contain components other than $Al_2O_3$ and $SiO_2$, such as MgO, CaO, $Cr_2O_3$, $Fe_2O_3$, $TiO_2$, $ZrO_2$, $Na_2O$, $K_2O$, etc., since such does not appreciably affect the reactivity of the refractory with the alkali metal oxide. Whereas, when the refractory's alkali metal oxide content exceeds 10 percent by weight, its reactivity with the alkali metal oxide is lowered. It is particularly desirable in the invention that the alkali metal oxide content of the refractory should be approximately 0.5–2 percent.

The above-described refractory can be used in optional form, such as grains, blocks, sheet, rod, tube, etc., and it may be constructed dismountably as a part of the tank wall. It is well in accord with the purpose of this invention to use the refractory in the form to provide a broad surface area.

The low alkali or nonalkali glass useful for the present invention is well known among the trade. It is essential that the low alkali or nonalkali should have an alkali content lower than that of the glass ribbon. As such glass, for example normally alumina-silicate glass of the following compositions:

| | |
|---|---|
| $SiO_2$ | 5–65% |
| $B_2O_3$ | 0–20% |

| | |
|---|---|
| $Al_2O_3$ | 5–30% |
| CaO | 0–30% |
| MgO | 0–10% | or the porous high silica glass prepared by heattreating borosilicate glass at 500°–650° C. for several hours to cause phase separation and immersing the same in hydrochloric or sulfuric acid of 90°–100° C. is used. Among those glasses, those containing not more than 10 percent, particularly around 0.2 percent, of alkali metal oxide are normally preferred. Those glasses can be used as porous glass or glass fiber in order to increase these surface area.

According to the present invention, above-described refractory or glass is detachably placed or replaceably immersed in the molten metal bath to be contacted with the molten metal. For this purpose, the refractory or glass for removing the alkali metal oxide may be simply immersed in the molten metal bath, preferably at such locations horizontally spaced sidewards from glass ribbon. Or, a chamber or chambers into and from which the molten metal can freely enter and leave may be provided outside the tank of molten metal bath, and the refractory or glass for removing the alkali metal oxide is removably placed therein. In the latter case, two passages are provided between the tank and said chamber respectively for entrance and exit of the molten metal, and the entrance, exit and circulation of the metal can be effected by electrical or mechanical means, or by natural convection.

In the present invention, since the refractory or glass for removing the alkali metal oxide reacts with said alkali metal oxide at the surface portions, it is desirable that the refractory or glass should be given a greatest surface area possible. For this purpose, the refractory can be conveniently formed into plural thin sheets and disposed in the bath, outer chambers, etc., as properly spaced. Also the glass can be conveniently made into fibrous form, and further woven into fabric if necessary.

The reaction rate between the refractory or glass for removing alkali metal oxide and the alkali metal oxide in the molten metal is particularly high at the initial stage of contact of the former with the molten metal, and thereafter the reaction rate is gradually reduced as the alkali metal oxide content in the surface layer of the refractory or glass increases.

The manner or speed of reduction in above reaction rate differs somewhat depending on the amount of said alkali metal oxide-removing agent employed, surface area and form thereof, produced quantity of flat glass, etc., but normally speaking, the reaction rate starts to drop several days after the agent is first contacted with the molten metal. Accordingly, in the present invention the refractory or glass member or members on which the reaction product of alkali metal oxide therewith is formed at the surface portions are withdrawn from the molten metal bath and exchanged with fresh refractory or glass members for removing alkali metal oxide, for example, at 10–20 days' intervals.

In the preferred embodiment of the present invention in which the refractory composed of $Al_2O_3$ and $SiO_2$ at the weight ratio of 15:85 to 35:65 is employed, the gaseous matter dissolved in the molten metal also is effectively reduced. In this case, if the refractory is positioned below the glass ribbon, the bubbles released from the refractory rise to the bottom of glass ribbon to impair quality of the latter. Therefore, the refractory needs to be immersed in the molten metal bath at the location spaced sidewards from glass ribbon. Whereas, if a chamber through which the molten metal is passed is provided outside the tank and the refractory member is placed in said chamber, the space in the upper part of said chamber is connected either to the atmosphere covering the molten metal bath or to a suction means, so that the released gas may be eliminated.

The foaming from the refractory is again most conspicuous during the initial period of contact thereof with the molten metal, and the foaming rate gradually drops as the glassy layer is formed on the surface of the refractory member. Therefore, changing of the refractory member or members after the aforesaid time of use also well meets the purpose of reducing the gaseous matter in the molten metal.

When the molten metal is tin or tin-containing alloy, and the molten metal bath is covered with nonoxidizing atmosphere containing hydrogen, foaming or bubbling of the hydrogen gas dissolved in the molten metal is more vigorous, if the refractory is immersed in the high temperature portion of the molten metal bath, particularly at the portion where the temperature of the molten metal is approximately 960° C. or above, to the depth not greater than approximately 20 mm. from the surface level.

In accordance with the present invention, foaming takes place with the refractory serving as the nuclei, which is immersed in the portion of molten metal as spaced sidewards from glass ribbon. Consequently the gaseous matter dissolved in the molten metal is effectively reduced. Thus the bubble formation under the glass ribbon decreases, and the inconveniences caused by such bubble formation are eliminated or reduced.

It is also possible to further improve the effect of this invention by such means as controlling the flow of molten metal in the bath, or providing a dam made of, for example, carbon, in the molten metal bath for preventing diffusion of the gaseous matter dissolved in the molten metal.

The invention hereinafter will be explained with reference to the following Example, based on the attached drawings.

EXAMPLE 1

Figure 1:
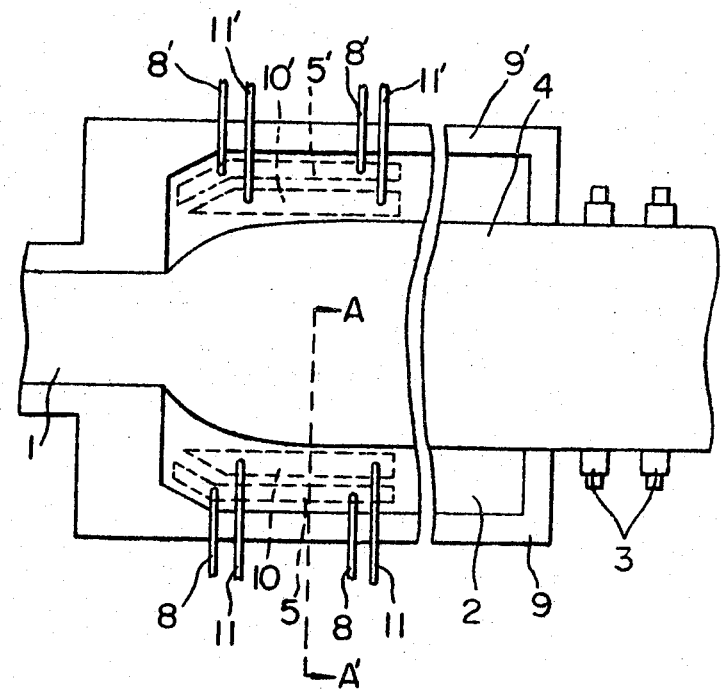
FIG. 1 is a plan view of an embodiment of the apparatus useful for practicing the subject process.
Figure 2:
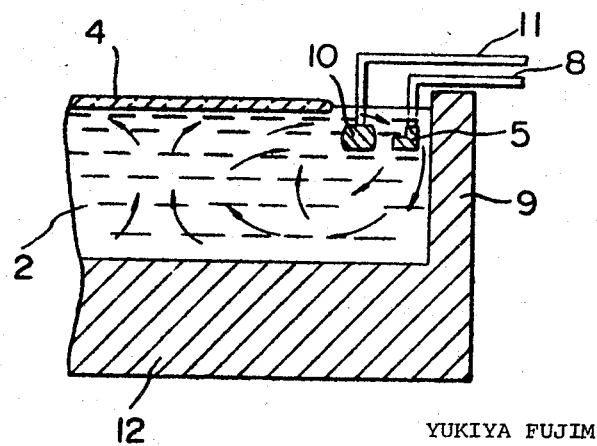
FIG. 2 is a partially enlarged cross section of the apparatus of FIG. 1, viewed along the line A—A'.
Figure 3:
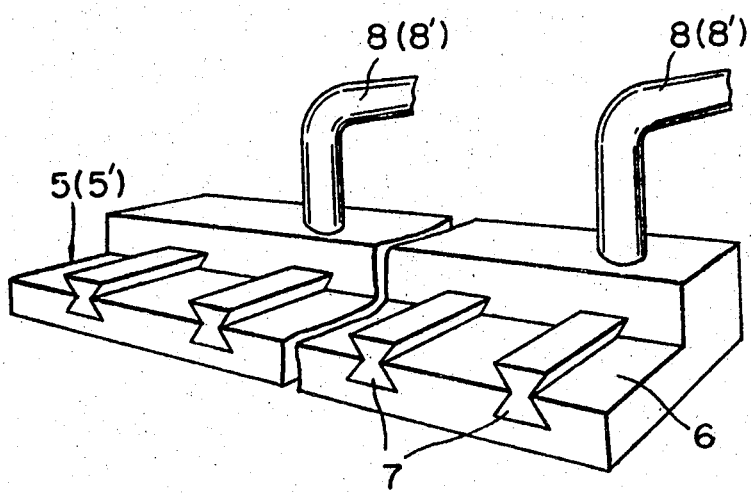
FIG. 3 is a perspective view of the refractory for degassing and dealkalizing which is used with the apparatus of FIG. 1.

Glass of the below-specified composition:

| | |
|---|---|
| $SiO_2$ | 72% |
| $Al_2O_3$ | 2% |
| CaO | 8% |
| MgO | 4% |
| $Na_2O$ | 13% |
| $K_2O$ | 1% |
| $Fe_2O_3$ | trace | was molten in a glass-melting furnace (not shown) and processed through the apparatus as illustrated in FIGS. 1 and 2. The molten glass was caused to flow onto molten tin or tin alloy of approximately 1,000° C. in the bath through the entrance 1 at a controlled rate, and pulled by the carrying rolls 3 to advance on said molten metal bath 2. In the bath 2, refractory members 5 and 5' were immersed at the two side portions, spaced from the respective edge of the glass ribbon 4, to serve as the nuclei of foaming as well as the alkali metal oxide-removing agent. Each of said refractory members 5 and 5' was formed by embedding burned bricks 7 (50×50×70 mm. each) in carbon sheath 6, as illustrated in FIG. 3, which was supported by the arm 8 or 8', substantially in parallel with the side wall 9 or 9' of the tank, to such a depth that the top of bricks 7 were immersed approximately 15 mm. from the bath surface. The composition of the burned brick 7 was as follows:

| | | |
|---|---|---|
| $SiO_2$ | 72.7 wt. % | |
| $Al_2O_3$ | 22.9 wt. % | ($Al_2O_3/SiO_2$=24.0/76.0) |
| MgO | 0.3 wt. % | |
| $Fe_2O_3$ | 1.0 wt. % | |
| $TiO_2$ | 1.5 wt. % | |
| $Na_2O$ | 0.3 wt. % | |
| $K_2O$ | 1.0 wt. % | |

By the sides of refractory members 5 and 5' closer to the glass ribbon 4, carbon members 10 and 10' for controlling the course of molten metal flow were provided, which were fixed as immersed in the molten metal by the supporting means 11 and 11'. If the mechanical strength of the refractory members 5 and 5' is insufficient, they may be lengthwisely divided into plural parts.

As aforesaid, when the burned brick 7 was contacted with the molten metal 2 in tank, a part of the gaseous matter dissolved in the molten metal was released from the surface of brick 7 as bubbles. Thus the amount of gaseous matter dissolved in the molten metal was reduced. Also the surface portions of the burned brick 7 became glassy, reacting with the alkali metal oxide eluted into the molten metal from glass ribbon 4. When the thickness of such glassy layer reached approximately 1 mm., the performance of burned brick 7 as foaming nuclei and alkali metal oxide-removing agent was reduced to substantially zero. Normally this stage was reached approximately 2 to 3 weeks after the immersion of brick 7 in molten metal bath 2 was started. Whereupon the burned bricks 7 were replaced.

Sidewalls 9,9' and tank bottom wall, 12 are constructed of a calcined refractory product composed mainly of silica and alumina. On the surfaces of these walls on the side contacting the molten metal there are formed glassified portions of a certain thickness capable of reacting with alkali metal oxides in the molten metal. However, since alkali metal oxides in the molten metal react preferentially with a fresh burned brick 7 dipped in the bath, the increase of the thickness in the glassified portions of the wall surfaces is prevented and hence, separation and floating of glassified portions from the wall surfaces can be also prevented.

Since the molten metal in the tank 2 was heated by the glass ribbon 4 and cooled by the sidewalls 9,9', and the tank bottom 12, presumably the molten metal flow as indicated with the arrows in FIG. 2 was formed. The flow-controlling means 10 and 10' were provided to assist or promote such a flow pattern. The gaseous matter dissolved into the molten metal in bath 2 from the portions where the molten metal not covered with glass ribbon 4 directly contacted with the atmosphere could be reduced by the burned brick 7 as already mentioned. The molten metal in said portions flowed downwards along the sidewalls 9,9', then to the center along the bottom structure 12, and wherefrom upwards due to the influence of heating by the glass ribbon 4. Thus the gas concentration below the glass ribbon 4 could be sufficiently reduced. Consequently the detrimental effect of bubble formation on the glass ribbon 4 could also be reduced at the low temperature portion of molten metal bath. The flow-controlling members 10 and 10' further possess the effect of preventing diffusion of gases dissolved in the molten metal in the vicinity of said members.

The damages on the glass ribbon incurred by the bubble formation and adhesion of glassy foreign matter as have been described in the foregoing were substantially completely eliminated throughout the operations practiced as in this Example.

EXAMPLE 2

Figure 4:
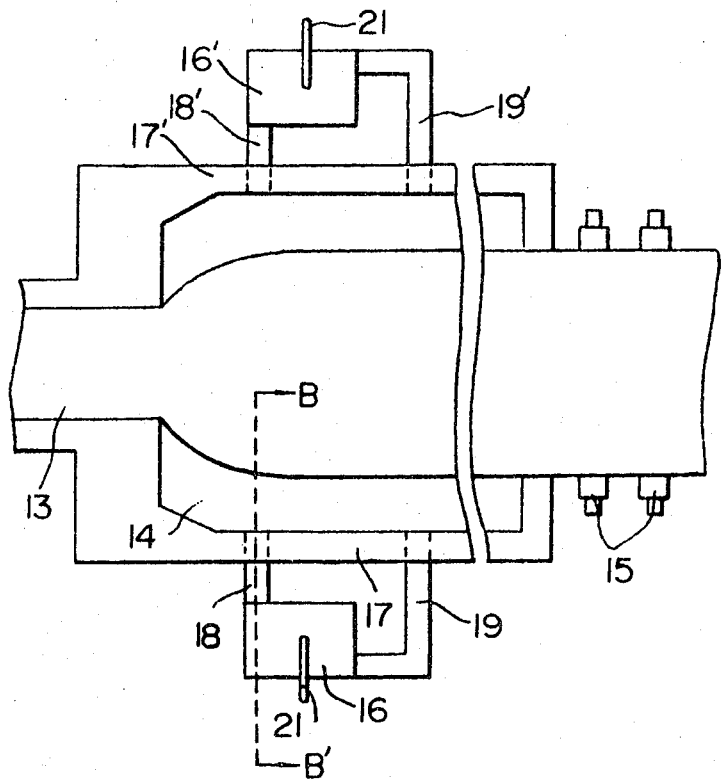
FIG. 4 is a plan view showing another embodiment of the apparatus useful for practicing the subject process.
Figure 5:
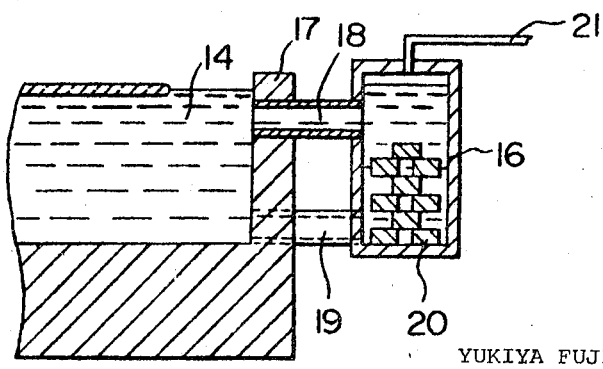
FIG. 5 is a partially enlarged cross section of the apparatus of FIG. 4, viewed along the line B—B'.

Referring to FIGS. 4 and 5, the glass of identical composition with that used in Example 1 was molten in a glass-melting furnace (not shown), caused to flow onto the molten metal bath 14 through the entrance 13 at a controlled rate, and pulled by the carrying rolls 15 to advance onto said molten metal bath 14. At both sides of the tank, respectively the chambers 16 and 16' were provided, and molten glass introducing passages 18,18' are connected with the upper portions of chambers 16,16'. Passages 19,19' for returning the molten metal to the tank are connected with the lower portions of chambers 16,16'. Connecting points of passages 18,18' with the tank are formed to pierce through sidewalls 17,17' at the portions a little lower than the level of the surface of the molten metal, and connecting points of passages 19,19' with the tank are provided in the lower portions of the sidewalls of the tank and are positioned more downstream than the connecting points of the passages 18,18' with the tank. Accordingly, the molten metal 14 in the tank was led thereinto through the passage 18,18'. The molten metal was returned into the bath 14 from the chambers 16,16', through the passages 19,19'. The above course of the molten metal flow was induced by natural convection, since the metal flowed downwards in the chambers 16 and 16', as cooled therein.

In said chambers 16,16', burned bricks 20 (30×100×300 mm. each) were piled up in the form of lattice. The composition of brick 20 was as follows:

| | | |
|---|---|---|
| $SiO_2$ | 76.7 wt. % | |
| $Al_2O_3$ | 19.5 wt. % | ($Al_2O_3/SiO_2$=20.3/79.7) |
| MgO | 0.2 wt. % | |
| CaO | 0.4 wt. % | |
| $Fe_2O_3$ | 1.3 wt. % | |
| $TiO_2$ | 1.0 wt. % | |
| $Na_2O$ | 0.1 wt. % | |
| $K_2O$ | 0.7 wt. % | |

Because the freed gas was confined in the chambers 16,16', it was sucked by the suction means (not shown) through pipes 21 and 21'. The pressure in the spaces at the upper parts of chambers 16,16' may be equal with, or slightly below, the atmospheric pressure.

Substantially the same results as of Example 1 were also obtained by this Example, and the damages incurred on the glass ribbon by the bubble formation and adhesion of glassy foreign matter were substantially completely eliminated.

EXAMPLE 3

Figure 6:
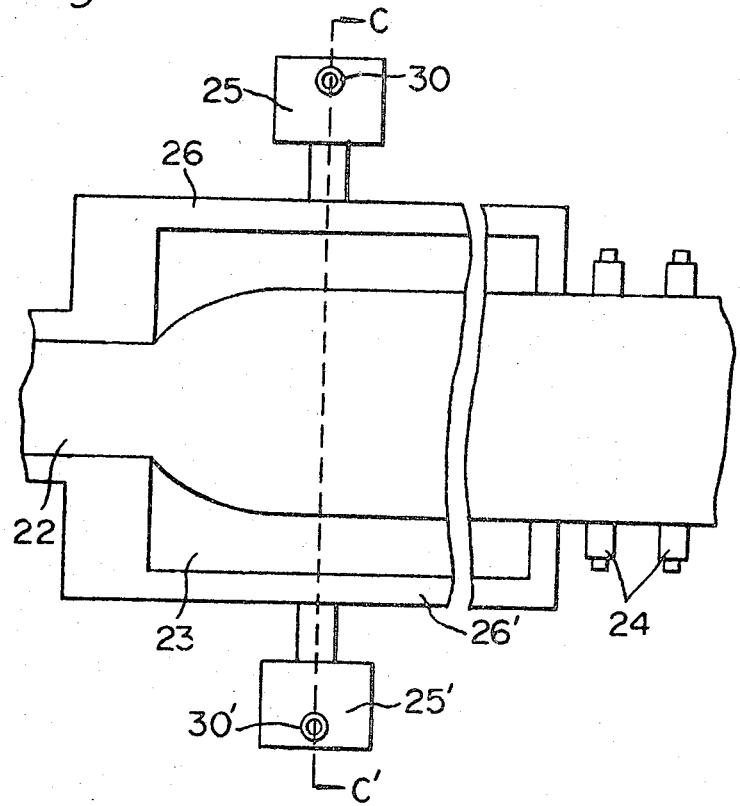
FIG. 6 is a plan view of still another embodiment of the apparatus useful for the subject process.
Figure 7:
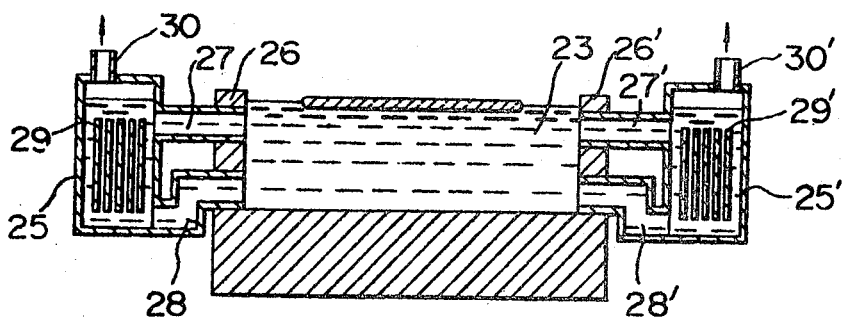
FIG. 7 is a cross section of the apparatus of FIG. 6, viewed along the line C—C'.

Referring to FIGS. 6 and 7, the glass of the identical composition with that employed in Example 1 was molten in the glass-melting furnace (not shown), and caused to flow onto the molten metal bath 23 contained in tank, through the entrance 22 at a controlled rate. The glass spread on the bath was pulled by the carrying rolls 24 and advanced on the bath in the form of glass ribbon. At both sides of the molten metal bath 23, chambers 25,25' were provided respectively, into which the molten metal of the bath 23 was led through the passages 27,27' bored piercing through the side walls 26,26', and positioned above passages 28,28'. The molten metal was returned to the bath 23 from the chambers through the passages 28,28'. Because the molten metal was cooled and flowed downwards in the chambers 25,25', the above circulation of the molten metal was effected by natural convection.

Burned bricks 29,29' of the following composition:

| | | |
|---|---|---|
| $SiO_2$ | 72.7 wt. % | |
| $Al_2O_3$ | 22.9 wt. % | ($Al_2O_3/SiO_2$=24/76) |
| MgO | 0.3 wt. % | |
| CaO | 0.3 wt. % | |
| $Fe_2O_3$ | 1.0 wt. % | |
| $TiO_2$ | 1.5 wt. % | |
| $Na_2O$ | 0.3 wt. % | |
| $K_2O$ | 1.0 wt. % | | were put in the chambers 25,25'. In order to enlarge the surface area of the bricks 29,29', each brick was cut into plural sheets of 20×50×300 mm. in size, which were fixed on a supporting frame (not shown) fit in each of the chambers 25 and 25', at regular intervals.

When the molten metal containing alkali metal oxide and gaseous matter dissolved therein was led into the chambers 25,25', the surface portions of the bricks 29,29' coming into contact with the molten metal reacted with the alkali metal oxide and were converted to glassy material. The portion of the glassy material which floated on the molten metal surfaces in the chambers 25,25' was removed. Also the dissolved gas which was released as bubbles was removed by the suction means (not shown) through pipes 30,30'.

The bricks 29,29' in the chambers 25,25' were replaced with new ones every week. Thus withdrawn, used bricks 29,29' were covered with the glassy layers over substantially the entire surfaces, demonstrating that they reacted well with the alkali metal oxide in the molten metal.

The damages conventionally incurred on the glass ribbon were conspicuously reduced, throughout the operations performed in the above-described manner.

It is also possible to replace the bricks 29,29' with glass fiber fabrics of low alkali metal oxide content, in the apparatus substantially identical with that employed in this Example. For example, borosilicate glass composed of 75 weight percent of $SiO_2$, 20 percent of $B_2O_3$, and 5 percent of $Na_2O$ was melted and spun, the glass fiber formed was treated at 500°–650° C. for several hours, and thereafter further treated with 3N-HCl of 98° C. followed by weaving into fabric, to be used for this purpose.

The fabric was fixed on a supporting frame made of carbon, immersed in the molten metal, and exchanged at several days' intervals with approximately equal dealkalizing effect to the foregoing. The alkali metal oxide content of the glass fabric was initially approximately 0.2 percent by weight, which reached 5.8 percent after 6 days of immersion. This result indicates that the alkali metal oxide in the molten metal entered into the fabric woven of glass fibers.

We claim:

1. A process for the removal of alkali metal oxide impurities from a molten metal bath of tin and tin alloy for use in the continuous production of flat glass by the flowing out molten glass onto said molten metal bath, advancing and spreading said molten glass in the form of ribbon, characterized by the improvement in that a material selected from the group consisting of acidic oxide refractories, neutral oxide refractories, low alkali glass and nonalkali glass is replaceably immersed in said molten metal bath and is contacted with said metal bath to form a reaction product of it with the alkali metal oxide present in said metal bath as impurities, and replacing said material on which is formed the reaction product with new such material before glass imperfections evolve as a result of the formation rate of said reaction product being reduced, whereby the concentration of the alkali metal oxide in said metal bath increases to an extent of causing glass imperfections.

2. The process as defined in claim 1 in which the alkali metal oxide content of the acidic oxide refractory, neutral oxide refractory and low-alkali glass is not greater than 10 percent by weight.

3. The process as defined in claim 1 in which the substance is an alumina-silicate refractory of which total content of alumina and silica is at least 90 percent by weight, and in which the weight ratio of $Al_2O_3$ to $SiO_2$ ranges from 15:85 to 35:65.

4. The process as defined in claim 1 in which the acidic oxide refractory and neutral oxide refractory are in the form of a block.

5. The process as defined in claim 1 in which the low alkali and nonalkali glass is used in the form of fabric woven of a glass fiber.

6. A process as defined in claim 1 in which said material is allowed to contact said molten metal under the static condition.

7. A process for the removal of alkali metal oxides and gases dissolved therein from a molten metal bath of tin and tin alloy for use in the continuous production of flat glass by flowing out molten glass onto said molten bath, advancing and spreading said molten glass in the form of ribbon, characterized by the improvement wherein a refractory material having an $Al_2O_3/SiO_2$ weight ratio in a range 15/85 to 35/65, the total weight of alumina and silica being above 90 percent of refractory material, is replaceably immersed in said molten metal bath in a position laterally spaced apart in relation to said ribbon glass, and thereby said refractory material is contacted with said metal bath, to allow said refractory material to act as the foaming nucleus in order to reduce the amounts of gases dissolved in said metal bath by defoaming, and to form a reaction product of the alkali metal oxide which is present in said metal bath as impurities on the surface of said refractory material, and periodically replacing said refractory material with new such material before glass imperfections tend to evolve each time said refractory material becomes coated with said metal oxide reaction product to a predeterminable extent.

8. A process as defined in claim 7 in which said refractory material is replaced with said new such material before the formation rate of the reaction product and the defoaming rate of the gas are respectively reduced such that the concentration of the alkali metal oxide, and the gases dissolved in said molten metal bath increase to the extent of causing said glass imperfections.

9. A process as defined in claim 7 wherein the molten metal bath has relatively high and lower temperature portions, and wherein said refractory material is allowed to contact the molten metal at the high temperature portion in the molten metal bath.

10. A process as defined in claim 7 in which said refractory material is allowed to contact the molten metal under the static condition.

* * * * *